(12) United States Patent
Manolakos et al.

(10) Patent No.: US 12,316,572 B2
(45) Date of Patent: *May 27, 2025

(54) POSITIONING MEASUREMENT REPORTING

(71) Applicant: QUALCOMM Incorporated, San Diego, CA (US)

(72) Inventors: Alexandros Manolakos, Athens (GR); Weimin Duan, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/428,047

(22) Filed: Jan. 31, 2024

(65) Prior Publication Data

US 2024/0178971 A1    May 30, 2024

Related U.S. Application Data

(63) Continuation of application No. 17/318,699, filed on May 12, 2021, now Pat. No. 11,991,113.

(Continued)

(51) Int. Cl.
*H04W 24/08* (2009.01)
*H04L 5/00* (2006.01)
*H04W 72/1263* (2023.01)

(52) U.S. Cl.
CPC .......... *H04L 5/0053* (2013.01); *H04L 5/0005* (2013.01)

(58) Field of Classification Search
CPC . H04L 5/0053; H04L 5/0005; H04W 72/1263
See application file for complete search history.

(56) References Cited

U.S. PATENT DOCUMENTS

2010/0238905 A1* 9/2010 Hamabe .............. H04W 52/242
                                                      370/335
2013/0328720 A1* 12/2013 Marshall ................ G01S 19/14
                                                      342/357.76

(Continued)

FOREIGN PATENT DOCUMENTS

EP          2437401 A1      4/2012
WO         2019083596       5/2019

(Continued)

OTHER PUBLICATIONS

3GPP TSG-RAN WG1 Meeting#97, R1-1907780 Title:Correction on TC-RNTI in 38.214 with DCI format 0-1 (Year: 2019).*

(Continued)

*Primary Examiner* — Christopher M Crutchfield
*Assistant Examiner* — Abusayeed M Haque
(74) *Attorney, Agent, or Firm* — SUNSTEIN LLP/Qualcomm

(57) ABSTRACT

A method of providing positioning state information in a channel usable for conveying the positioning state information includes: obtaining a positioning state information resource allocation parameter; determining a positioning resource amount based on the positioning state information resource allocation parameter, the positioning resource amount being an amount of resources of the channel usable for conveying the positioning state information; and transmitting the positioning state information over the channel while occupying no more than the positioning resource amount of resources of the channel.

49 Claims, 8 Drawing Sheets

Related U.S. Application Data

(60) Provisional application No. 63/028,003, filed on May 21, 2020.

(56) References Cited

U.S. PATENT DOCUMENTS

| | | | |
|---|---|---|---|
| 2014/0254509 A1 | 9/2014 | Chen et al. | |
| 2015/0146642 A1 | 5/2015 | Seo et al. | |
| 2017/0171857 A1 | 6/2017 | Lee et al. | |
| 2018/0048444 A1 | 2/2018 | Park et al. | |
| 2019/0334608 A1 | 10/2019 | Kwon et al. | |
| 2020/0021946 A1 | 1/2020 | Kumar et al. | |
| 2020/0025936 A1* | 1/2020 | Zhou | G01S 19/072 |
| 2020/0100232 A1 | 3/2020 | Onggosanusi et al. | |
| 2020/0112415 A1* | 4/2020 | Huang | H04L 5/0044 |
| 2020/0112996 A1 | 4/2020 | Pan et al. | |
| 2020/0153574 A1* | 5/2020 | Shin | H04W 4/40 |
| 2020/0205141 A1* | 6/2020 | Khoshnevisan | H04L 5/0055 |
| 2020/0205241 A1* | 6/2020 | Verdoliva | F24C 7/067 |
| 2020/0252255 A1 | 8/2020 | Sorrentino et al. | |
| 2020/0275440 A1* | 8/2020 | Wu | H04W 72/0446 |
| 2020/0351813 A1* | 11/2020 | Manolakos | H04W 24/10 |
| 2020/0351843 A1 | 11/2020 | Zhou et al. | |
| 2020/0366422 A1* | 11/2020 | Nguyen | H04W 4/40 |
| 2021/0092558 A1 | 3/2021 | Duan et al. | |
| 2021/0153114 A1 | 5/2021 | Lindheimer et al. | |
| 2021/0367736 A1 | 11/2021 | Manolakos et al. | |
| 2021/0368298 A1 | 11/2021 | Opshaug et al. | |

FOREIGN PATENT DOCUMENTS

| | | | |
|---|---|---|---|
| WO | 2020172570 A1 | 8/2020 | |
| WO | 2020172576 A1 | 8/2020 | |
| WO | 2020198271 A1 | 10/2020 | |
| WO | WO-2020197829 A1 * | 10/2020 | G01S 19/01 |
| WO | 2021198271 A1 | 10/2021 | |
| WO | 2021203443 A1 | 10/2021 | |

OTHER PUBLICATIONS

3GPP TSG-RAN WG1 Meeting#99, R1-1913258 Title:Clearification of UL-SCH indicator with DCI 0_1 (Year: 2019).*

3GPP TSG-RAN WG4 Meeting#94-e-bis, R4-2005839 Title:[draft] LS on report mapping for UE positioning measurment (Year: 2020).*

CATT: "Summary #2 of UE and gNB Measurements for NR Positioning", 3GPP Draft, 3GPP TSG RAN WG1 #99, R1-1913447, 3rd Generation Partnership Project (3GPP), Mobile Competence Centre, 650, Route Des Lucioles, F-06921, Sophia-Antipolis Cedex, France, vol. RAN WG1, No. Reno, Nevada, USA, Nov. 18, 2019-Nov. 22, 2019, Nov. 25, 2019 (Nov. 25, 2019), XP051830726, 23 pages, Paragraph "4.2 UE measurement configuration and reporting.

CMCC: "Discussion on Disabling of HARQ Feedback for IoT NTN", 3GPP TSG RAN WG1 #112, R1-2301022, Athens, Greece, Feb. 27-Mar. 3, 2023, 4 Pages.

International Preliminary Report on Patentability—PCT/US2021/032176—The International Bureau of WIPO—Geneva, Switzerland—Dec. 1, 2022.

International Search Report and Written Opinion—PCT/US2021/032176—ISA/EPO—Sep. 6, 2021.

RAN4: "[draft] LS on Report Mapping for UE Positioning Measurement", 3GPP TSG-RAN WG4 Meeting#94-e-bis, R4-2005839, Electronic Meeting, Apr. 20-30, 2020, 3 Pages.

ZTE: "Discussion on Disabling of HARQ Feedback for IoT-NTN", 3GPP TSG RAN WG1 #112, R1-2300706, Athens, Greece, Feb. 27-Mar. 3, 2023, 5 Pages.

* cited by examiner

POSITIONING MEASUREMENT REPORTING

CROSS-REFERENCE TO RELATED APPLICATION

This application is a continuation of U.S. application Ser. No. 17/318,699, filed May 12, 2021, entitled "POSITIONING MEASUREMENT REPORTING", which claims the benefit of U.S. Provisional Application No. 63/028,003, filed May 21, 2020, entitled "POSITIONING MEASUREMENT REPORTING", both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example device capable of wireless communication includes: a transmitter configured to transmit outbound signals wirelessly; a memory; and a processor communicatively coupled to the memory and the transmitter, the processor being configured to: obtain a positioning state information resource allocation parameter; determine a positioning resource amount based on the positioning state information resource allocation parameter, the positioning resource amount being an amount of resources of a channel usable for conveying positioning state information; and transmit the positioning state information, via the transmitter over the channel, occupying no more than the positioning resource amount of resources of the channel.

Implementations of such a device may include one or more of the following features. The positioning state information resource allocation parameter is a selected parameter, and the processor is configured to retrieve the selected parameter from a plurality of positioning state information resource allocation parameters stored in the memory. The processor is configured to retrieve the selected parameter based on a positioning method associated with the positioning state information. The device includes a receiver communicatively coupled to the processor and configured to receive inbound signals, and the processor is configured to retrieve the selected parameter based on control information received by the processor via the receiver. The device includes a receiver communicatively coupled to the processor and configured to receive inbound signals, and the processor is configured to add a new positioning state information resource allocation parameter, from a control signal received by the processor via the receiver, to the plurality of positioning state information resource allocation parameters stored in the memory.

Also or alternatively, implementations of such a device may include one or more of the following features. To obtain the positioning state information resource allocation parameter the processor is configured to: obtain a first positioning state information resource allocation sub-parameter; and obtain a second positioning state information resource allocation sub-parameter; to determine the positioning resource amount the processor is configured to: determine, based on the first positioning state information resource allocation sub-parameter, a first positioning resource sub-amount of resources of the channel; and determine, based on the second positioning state information resource allocation sub-parameter, a second positioning resource sub-amount of resources of the channel; and to transmit the positioning state information the processor is configured to: transmit a first portion of the positioning state information occupying no more than the first positioning resource sub-amount of resources of the channel; and transmit a second portion of the positioning state information occupying no more than the second positioning resource sub-amount of resources of the channel. The processor is configured to use a first channel state information resource allocation sub-parameter as the first positioning state information resource allocation sub-parameter and to use a second channel state information resource allocation sub-parameter as the second positioning state information resource allocation sub-parameter, and the first channel state information resource allocation sub-parameter corresponds to an amount of resources of the channel usable for conveying a first portion of channel state information and the second channel state information resource allocation sub-parameter corresponds to an amount of resources of the channel usable for conveying a second portion of the channel state information. The processor is configured to use a first channel state information resource allocation sub-parameter as the first positioning state information resource allocation sub-parameter and as the second positioning state information resource allocation sub-parameter, and the first channel state information resource allocation sub-parameter corresponds to an amount of resources of the channel usable for conveying a first portion of channel state information and a second channel state information resource allocation sub-parameter corresponds to an amount of resources of the channel usable for conveying a second portion of the channel state information.

Also or alternatively, implementations of such a device may include one or more of the following features. To transmit the positioning state information the processor is configured to concatenate the positioning state information to channel state information. To concatenate the positioning state information to the channel state information the processor is configured to concatenate a first portion of the positioning state information to a first portion of the channel state information and to concatenate a second portion of the positioning state information to a second portion of the channel state information.

Also or alternatively, implementations of such a device may include one or more of the following features. The processor is configured to transmit the positioning state information with a proximity, in the channel, to a reference signal based on at least one of control information associated with the positioning state information, or a quality of service associated with the positioning state information, or a positioning method associated with the positioning state information. The processor is configured to transmit the positioning state information without mapping at least a portion of the positioning state information to any resource element designated for conveying a hybrid automatic repeat request. The at least a portion of the positioning state information includes a fixed-payload portion of the positioning state information, a positioning fix estimate, a reference transmission/reception point identification, or a positioning measurement. The channel usable for conveying the positioning state information is a physical uplink shared channel (PUSCH), a physical downlink shared channel (PDSCH), or a physical sidelink shared channel (PSSCH).

Another example device capable of wireless communication includes: obtaining means for obtaining a positioning state information resource allocation parameter; determining means for determining a positioning resource amount based on the positioning state information resource allocation parameter, the positioning resource amount being an amount of resources of a channel usable for conveying positioning state information; and transmitting means for transmitting the positioning state information over the channel while occupying no more than the positioning resource amount of resources of the channel.

Implementations of such a device may include one or more of the following features. The device includes storing means for storing a plurality of positioning state information resource allocation parameters, the positioning state information resource allocation parameter is a selected parameter, and the obtaining means are for retrieving the selected parameter from the plurality of positioning state information resource allocation parameters in the storing means. The obtaining means include means for retrieving the selected parameter based on a positioning method for deriving the positioning state information. The obtaining means include means for receiving control information and for retrieving the selected parameter based on the control information. The obtaining means include means for receiving a new positioning state information resource allocation parameter from a control signal and for adding the new positioning state information resource allocation parameter to the plurality of positioning state information resource allocation parameters in the storing means.

Also or alternatively, implementations of such a device may include one or more of the following features. The obtaining means include: means for obtaining a first positioning state information resource allocation sub-parameter; and means for obtaining a second positioning state information resource allocation sub-parameter; the determining means include: means for determining, based on the first positioning state information resource allocation sub-parameter, a first positioning resource sub-amount of resources of the channel; and means for determining, based on the second positioning state information resource allocation sub-parameter, a second positioning resource sub-amount of resources of the channel; and the transmitting means include: means for transmitting a first portion of the positioning state information occupying no more than the first positioning resource sub-amount of resources of the channel; and means for transmitting a second portion of the positioning state information occupying no more than the second positioning resource sub-amount of resources of the channel. The obtaining means include means for using a first channel state information resource allocation sub-parameter as the first positioning state information resource allocation sub-parameter and for using a second channel state information resource allocation sub-parameter as the second positioning state information resource allocation sub-parameter, and the first channel state information resource allocation sub-parameter corresponds to an amount of resources of the channel usable for conveying a first portion of channel state information and the second channel state information resource allocation sub-parameter corresponds to an amount of resources of the channel usable for conveying a second portion of the channel state information. The obtaining means include means for using a first channel state information resource allocation sub-parameter as the first positioning state information resource allocation sub-parameter and as the second positioning state information resource allocation sub-parameter, and the first channel state information resource allocation sub-parameter corresponds to an amount of resources of the channel usable for conveying a first portion of channel state information and a second channel state information resource allocation sub-parameter corresponds to an amount of resources of the channel usable for conveying a second portion of the channel state information.

Also or alternatively, implementations of such a device may include one or more of the following features. The transmitting means include means for concatenating the positioning state information to channel state information. The transmitting means include means for concatenating a first portion of the positioning state information to a first portion of the channel state information and for concatenating a second portion of the positioning state information to a second portion of the channel state information.

Also or alternatively, implementations of such a device may include one or more of the following features. The transmitting means include means for transmitting the positioning state information with a proximity, in the channel, to a reference signal based on at least one of control information associated with the positioning state information, or a quality of service associated with the positioning state information, or a positioning method associated with the positioning state information. The transmitting means include means for transmitting the positioning state information without mapping at least a portion of the positioning state information to any resource element designated for conveying a hybrid automatic repeat request. The at least a portion of the positioning state information includes a fixed-payload portion of the positioning state information, a positioning fix estimate, a reference transmission/reception point identification, or a positioning measurement.

An example method of providing positioning state information in a channel usable for conveying the positioning state information includes: obtaining a positioning state information resource allocation parameter; determining a positioning resource amount based on the positioning state information resource allocation parameter, the positioning resource amount being an amount of resources of the channel usable for conveying the positioning state information; and transmitting the positioning state information over the channel while occupying no more than the positioning resource amount of resources of the channel.

Implementations of such a method may include one or more of the following features. The positioning state information resource allocation parameter is a selected parameter, and obtaining the positioning state information resource allocation parameter includes retrieving the selected parameter from a plurality of positioning state information resource allocation parameters stored in a memory. Retrieving the selected parameter is based on a positioning method for deriving the positioning state information. The method includes receiving control information, and retrieving the selected parameter is based on the control information. The method includes: receiving a new positioning state information resource allocation parameter from a control signal; and adding the new positioning state information resource allocation parameter to the plurality of positioning state information resource allocation parameters in the memory.

Also or alternatively, implementations of such a method may include one or more of the following features. Obtaining the positioning state information resource allocation parameter includes: obtaining a first positioning state information resource allocation sub-parameter; and obtaining a second positioning state information resource allocation sub-parameter; determining the positioning resource amount includes: determining, based on the first positioning state information resource allocation sub-parameter, a first positioning resource sub-amount of resources of the channel; and determining, based on the second positioning state information resource allocation sub-parameter, a second positioning resource sub-amount of resources of the channel; and transmitting the positioning state information includes: transmitting a first portion of the positioning state information occupying no more than the first positioning resource sub-amount of resources of the channel; and transmitting a second portion of the positioning state information occupying no more than the second positioning resource sub-amount of resources of the channel. Obtaining the positioning state information resource allocation parameter includes using a first channel state information resource allocation sub-parameter as the first positioning state information resource allocation sub-parameter and using a second channel state information resource allocation sub-parameter as the second positioning state information resource allocation sub-parameter, and the first channel state information resource allocation sub-parameter corresponds to an amount of resources of the channel usable for conveying a first portion of channel state information and the second channel state information resource allocation sub-parameter corresponds to an amount of resources of the channel usable for conveying a second portion of the channel state information. Obtaining the positioning state information resource allocation parameter includes using a first channel state information resource allocation sub-parameter as the first positioning state information resource allocation sub-parameter and as the second positioning state information resource allocation sub-parameter, and the first channel state information resource allocation sub-parameter corresponds to an amount of resources of the channel usable for conveying a first portion of channel state information and a second channel state information resource allocation sub-parameter corresponds to an amount of resources of the channel usable for conveying a second portion of the channel state information.

Also or alternatively, implementations of such a method may include one or more of the following features. Transmitting the positioning state information includes concatenating the positioning state information to channel state information. Concatenating the positioning state information to the channel state information includes concatenating a first portion of the positioning state information to a first portion of the channel state information and concatenating a second portion of the positioning state information to a second portion of the channel state information.

Also or alternatively, implementations of such a method may include one or more of the following features. Transmitting the positioning state information includes transmitting the positioning state information with a proximity, in the channel, to a reference signal based on at least one of control information associated with the positioning state information, or a quality of service associated with the positioning state information, or a positioning method associated with the positioning state information. Transmitting the positioning state information includes transmitting the positioning state information without mapping at least a portion of the positioning state information to any resource element designated for conveying a hybrid automatic repeat request. The at least a portion of the positioning state information includes a fixed-payload portion of the positioning state information, a positioning fix estimate, a reference transmission/reception point identification, or a positioning measurement.

An example non-transitory, processor-readable storage medium includes processor-readable instructions configured to cause a processor of a device to: obtain a positioning state information resource allocation parameter; determine a positioning resource amount based on the positioning state information resource allocation parameter, the positioning resource amount being an amount of resources of a channel usable for conveying positioning state information; and transmit the positioning state information over the channel while occupying no more than the positioning resource amount of resources of the channel.

Implementations of such a storage medium may include one or more of the following features. The positioning state information resource allocation parameter is a selected parameter, and the storage medium includes processor-readable instructions configured to cause the processor to retrieve the selected parameter from a plurality of positioning state information resource allocation parameters stored in a memory of the device. The storage medium includes processor-readable instructions configured to cause the processor to retrieve the selected parameter based on a positioning method associated with the positioning state information. The storage medium includes processor-readable instructions configured to cause the processor to retrieve the selected parameter based on control information received by the device. The storage medium includes processor-readable instructions configured to cause the processor to add a new positioning state information resource allocation parameter, from a control signal received by the device, to the plurality of positioning state information resource allocation parameters stored in the memory of the device.

Also or alternatively, implementations of such a storage medium may include one or more of the following features. The processor-readable instructions configured to cause the processor to obtain the positioning state information resource allocation parameter include processor-readable instructions configured to cause the processor to: obtain a first positioning state information resource allocation sub-parameter; and obtain a second positioning state information resource allocation sub-parameter; the processor-readable instructions configured to cause the processor to determine the positioning resource amount include processor-readable instructions configured to cause the processor to: determine, based on the first positioning state information resource allocation sub-parameter, a first positioning resource sub-amount of resources of the channel; and determine, based on the second positioning state information resource allocation sub-parameter, a second positioning resource sub-amount of resources of the channel; and the processor-readable instructions configured to cause the processor to transmit the positioning state information include processor-readable instructions configured to cause the processor to: transmit a first portion of the positioning state information occupying no more than the first positioning resource sub-amount of resources of the channel; and transmit a second portion of the positioning state information occupying no more than the second positioning resource sub-amount of resources of the channel. The storage medium includes processor-readable instructions configured to cause the processor to use a first channel state information resource allocation sub-parameter as the first positioning state information resource allocation sub-parameter and to use a second channel state information resource allocation sub-parameter as the second positioning state information resource allocation sub-parameter, and wherein the first channel state information resource allocation sub-parameter corresponds to an amount of resources of the channel usable for conveying a first portion of channel state information and the second channel state information resource allocation sub-parameter corresponds to an amount of resources of the channel usable for conveying a second portion of the channel state information. The storage medium includes processor-readable instructions configured to cause the processor to use a first channel state information resource allocation sub-parameter as the first positioning state information resource allocation sub-parameter and as the second positioning state information resource allocation sub-parameter, and wherein the first channel state information resource allocation sub-parameter corresponds to an amount of resources of the channel usable for conveying a first portion of channel state information and a second channel state information resource allocation sub-parameter corresponds to an amount of resources of the channel usable for conveying a second portion of the channel state information.

Also or alternatively, implementations of such a storage medium may include one or more of the following features. The processor-readable instructions configured to cause the processor to transmit the positioning state information include processor-readable instructions configured to cause the processor to concatenate the positioning state information to channel state information. The processor-readable instructions configured to cause the processor to concatenate the positioning state information to the channel state information include processor-readable instructions configured to cause the processor to concatenate a first portion of the positioning state information to a first portion of the channel state information and to concatenate a second portion of the positioning state information to a second portion of the channel state information.

Also or alternatively, implementations of such a storage medium may include one or more of the following features. The processor-readable instructions configured to cause the processor to transmit the positioning state information include processor-readable instructions configured to cause the processor to transmit the positioning state information with a proximity, in the channel, to a reference signal based on at least one of control information associated with the positioning state information, or a quality of service associated with the positioning state information, or a positioning method associated with the positioning state information. The processor-readable instructions configured to cause the processor to transmit the positioning state information include processor-readable instructions configured to cause the processor to transmit the positioning state information without mapping at least a portion of the positioning state information to any resource element designated for conveying a hybrid automatic repeat request. The at least a portion of the positioning state information includes a fixed-payload portion of the positioning state information, a positioning fix estimate, a reference transmission/reception point identification, or a positioning measurement.

DETAILED DESCRIPTION

Figure 1:
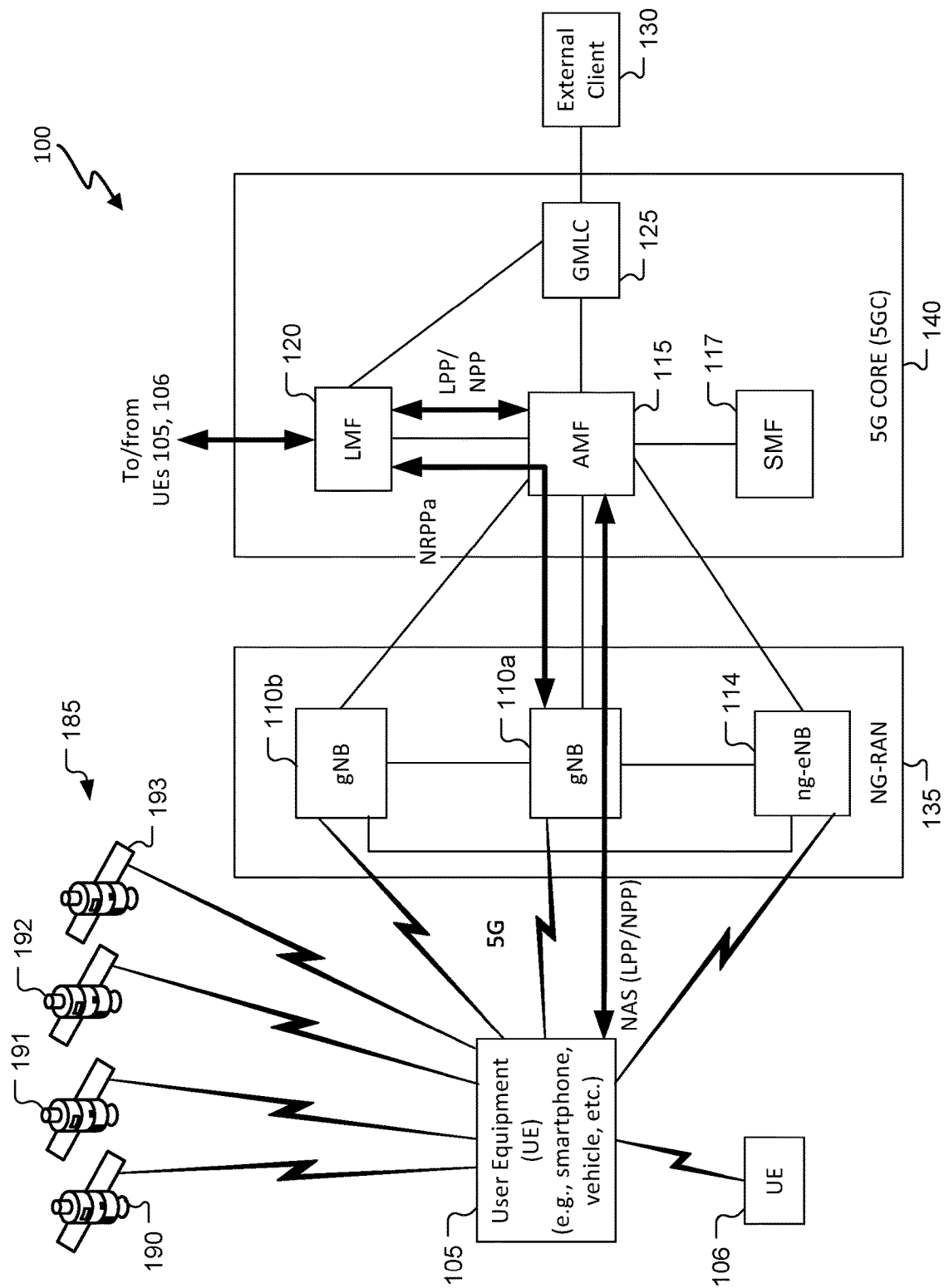
FIG. 1 is a simplified diagram of an example wireless communications system.

Techniques are discussed herein for reporting positioning state information. For example, resources of a channel may be allocated for reporting the positioning state information. The channel may be a channel transmitted by a user equipment (a UE-transmitted channel) or a channel transmitted by a network node (e.g., a base station or location server). A parameter from which an amount of resources of the channel to be allocated to the positioning state information may be calculated may be provided as part of control information. Multiple such parameters may be stored and one of the parameters selected, e.g., based on received control information, or based on a positioning method to be used, or based on a positioning session, etc., or a combination of two or more of these. Positioning state information may be concatenated to channel state information. For example, a fixed-payload portion of the positioning state information may be concatenated to a fixed-payload portion of the channel state information and a variable-payload portion of the positioning state information may be concatenated to a variable-payload portion of the channel state information. As another example, the positioning state information may be concatenated to multi-beam channel state information. The positioning state information may be provided over the channel with a priority relative to a reference signal such as a demodulation reference signal (DMRS). For example, the positioning state information may be provided over the channel with a proximity in relation to (e.g., in time and/or frequency) the reference signal corresponding to the priority. The positioning state information may have higher priority than at least some channel state information. At least some of the positioning state information may be prevented from being mapped to one or more resource elements designated for a hybrid automatic repeat request (HARQ). For example, a fixed-payload portion of the positioning state information, a positioning fix estimate, a transmission/reception point ID, and/or a positioning measurement may be prevented from being mapped to a HARQ. These are examples, and other examples may be implemented.

Items and/or techniques described herein may provide one or more of the following capabilities, as well as other capabilities not mentioned. Resources may be allocated to help ensure satisfaction of one or more quality of service metrics. Positioning state information may be mapped to a channel in such a way as to help prevent overwriting. Positioning state information may be mapped to a channel with a desired priority, e.g., to help ensure that quality of service metrics are met. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110*a*, 110*b*, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110*a*, 110*b*, 114 may be configured to communicate with the UE 105 via multiple carriers. Each of the BSs 110*a*, 110*b*, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (ELTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA)

for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
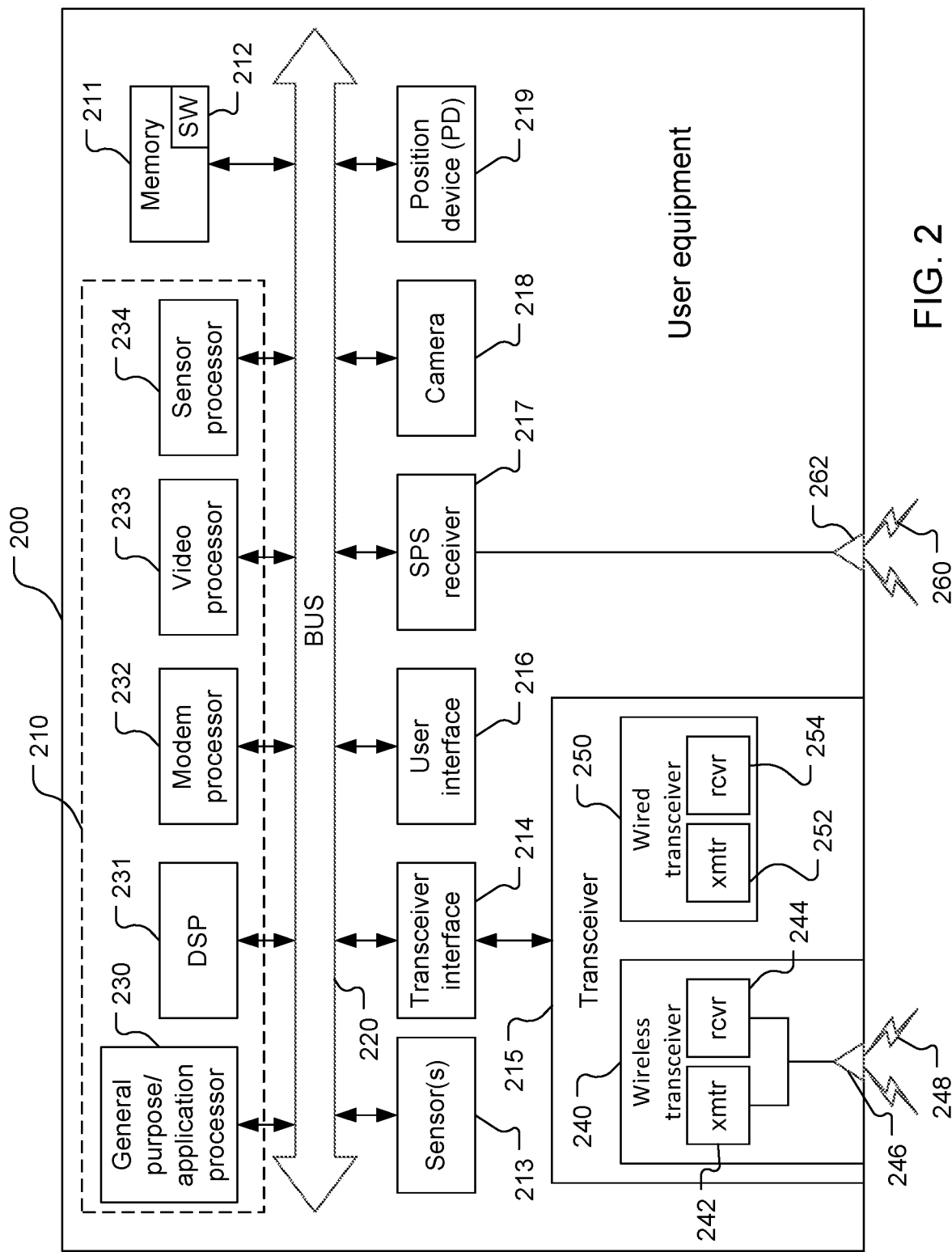
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
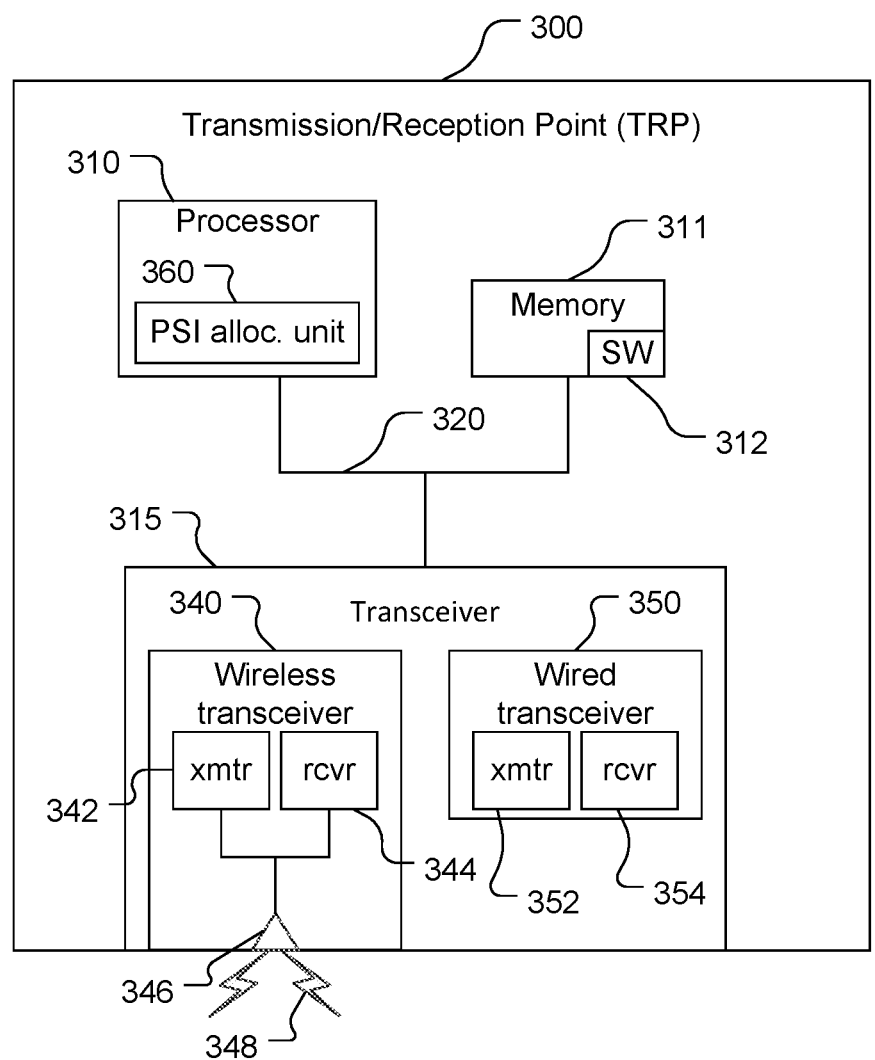
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. The processor 310 (possibly in conjunction with the memory 311 and, as appropriate, the transceiver 315 (or one or more portions thereof)) may include a positioning state information (PSI) allocation unit 360. The PSI allocation unit 360 may be configured similarly to a PSI allocation unit discussed with respect to FIG. 5, for transmission of positioning state information on one or more appropriate physical channels. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
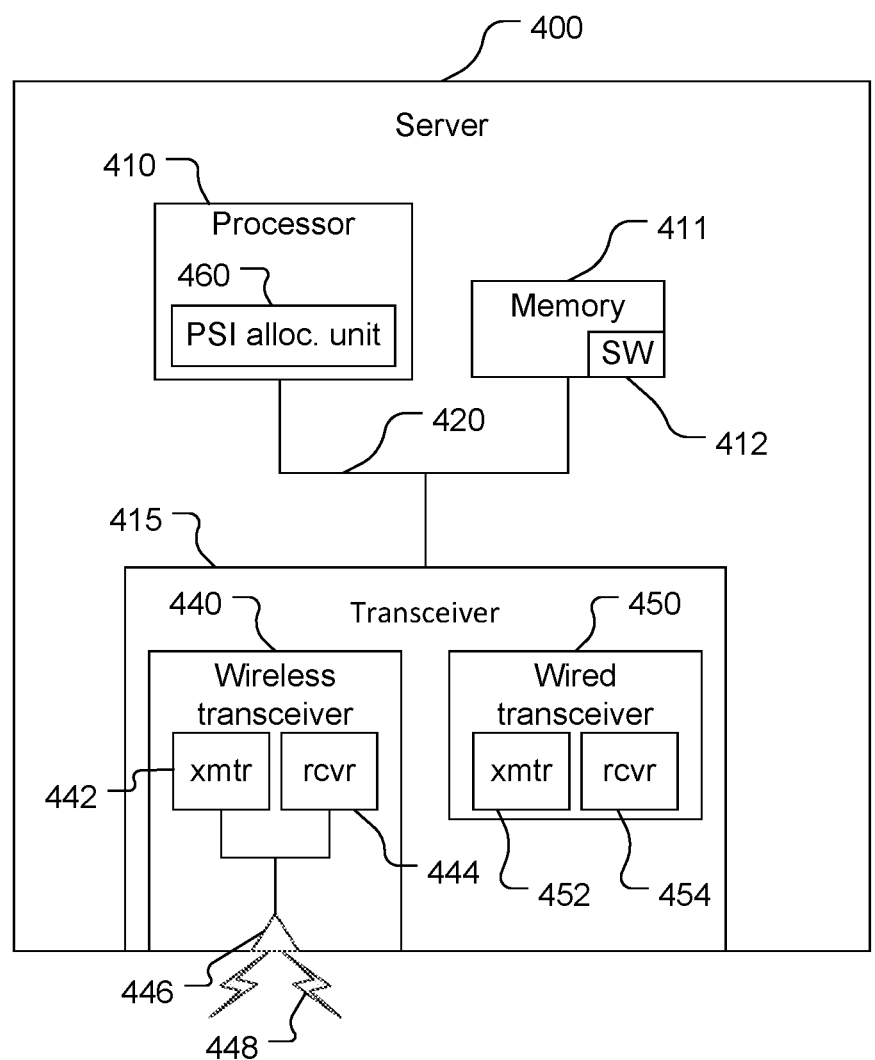
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. The processor 410 (possibly in conjunction with the memory 411 and, as appropriate, the transceiver 415 (or one or more portions thereof)) may include a positioning state information (PSI) allocation unit 460. The PSI allocation unit 460 may be configured similarly to a PSI allocation unit discussed with respect to FIG. 5, for transmission of positioning state information on one or more appropriate physical channels. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the invention, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx \text{-} Tx}$ or $UE_{Rx \text{-} Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-Positioning FrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource), can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred to as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Positioning State Information Resource Allocation

A channel that can be transmitted by a device may be used to convey information such as control information. The channel may be an uplink channel, a downlink channel, or a sidelink channel, depending on the device (e.g., a UE, a TRP, a server) transmitting the information. Examples of channels are channels that may be transmitted by a UE (a UE-transmitted channel) such as a Physical Uplink Shared Channel (PUSCH) or a Physical Sidelink Shared Channel (PSSCH), or channels that may be transmitted by a network entity (e.g., the TRP 300 or the server 400) such as a physical downlink shared channel (PDSCH) or a physical downlink control channel (PDCCH). The information conveyed may be control information, e.g., Uplink Control Information (UCI), from a UE to a network entity (e.g., a base station, a server, etc.), or Downlink Control Information (DCI) from a TRP or server to a UE. A portion of a channel may be repurposed for conveying control information such as UCI or DCI. While the description herein often refers to UCI and the PUSCH for illustrative purposes, the description is applicable to other information and one or more other channels whether the channel(s) is(are) UE-transmitted channel(s), such as a sidelink channel (such as the PSSCH), or transmitted by one or more other entities. Thus, the description is not limited to UE-transmitted channels such as the PUSCH and/or the PSSCH, but may also or alternatively be applicable to one or more other channels (e.g., PDSCH, PDCCH) transmitted by other entities such as base stations or servers. The UCI may be classified into different types that are separately coded, modulated, and mapped to channel resources to manage each type of information according to respective performance targets (e.g., to satisfy respective performance metrics). Classes of UCI include HARQ (Hybrid Automatic Repeat request), CSI (Channel State Information) type 1, and CSI type 2. The UCI may be mapped to the PUSCH, for example with HARQ given highest priority, followed by CSI type 1, followed by CSI type 2. CSI provides information regarding operation of a channel (a logical connection over a multiplexed medium between entities for communication). For example, CSI may include CQI (Channel Quality Indicator), PMI (Precoding Matrix Indicator), RI (Rank Indicator), CRI (CSI-RS (CSI Reference Signal) Indicator), LI (Layer Indicator), and/or layer 1 RSRP (physical layer Reference Signal Received Power), etc. CSI type 1 and CSI type 2 use different precoding, with CSI type 1 using a single-beam codebook for precoding and CSI type 2 using a multi-beam codebook for precoding. CSI type 1 may be less detailed than CSI type 2, and may use fewer bits than CSI type 2. CSI type 1 has lower precoding overhead than CSI type 2, and CSI type 2 may provide better performance, e.g., higher resolution. CSI payload size depends on CSI type, RI, CQI, PMI, CRI, LI, layer 1 RSRP, a number of carriers for CSI-RS reporting, semi-static configurations (e.g., number of CSI-RS ports, a CSI codebook type, a CSI reporting sub-band size, etc.), and can be from a single bit to hundreds of bits or more. CSI (either type 1 or type 2) may be reported in multiple parts, labeled part 1 and part 2. The CSI part 1 has a constant payload size and provides information about a payload size of the CSI part 2, which has a variable payload size. The payload size of part 1 is based on configuration parameters while the payload size of part 2 depends on configuration parameters and on the contents of part 1. The part 1 of each of multiple reports may be collected together and the part 2 of each of the multiple reports may be collected together and each of the collections separately encoded.

For each class of UCI, a high-layer parameter, called a beta parameter ($\beta$ parameter), may be used by a UE to determine an amount of resources within the PUSCH to dedicate to the respective UCI class. Different values of the beta parameter may correspond to a wide range of amounts of resources (e.g., quantities of REs), enabling re-purposing of a wide range of amounts of resources within the PUSCH to use for UCI transmission. The amount of REs to be used for UCI depends on the beta parameter and on a UCI payload size (potentially including a CRC (Cyclic Redundancy Check) overhead) and the spectral efficiency of the PUSCH. An upper bound may be placed on the total amount of resources that may be allocated to UCI to prevent excessive resource usage for UCI and to help ensure sufficient REs are available for UL data.

Figure 5:
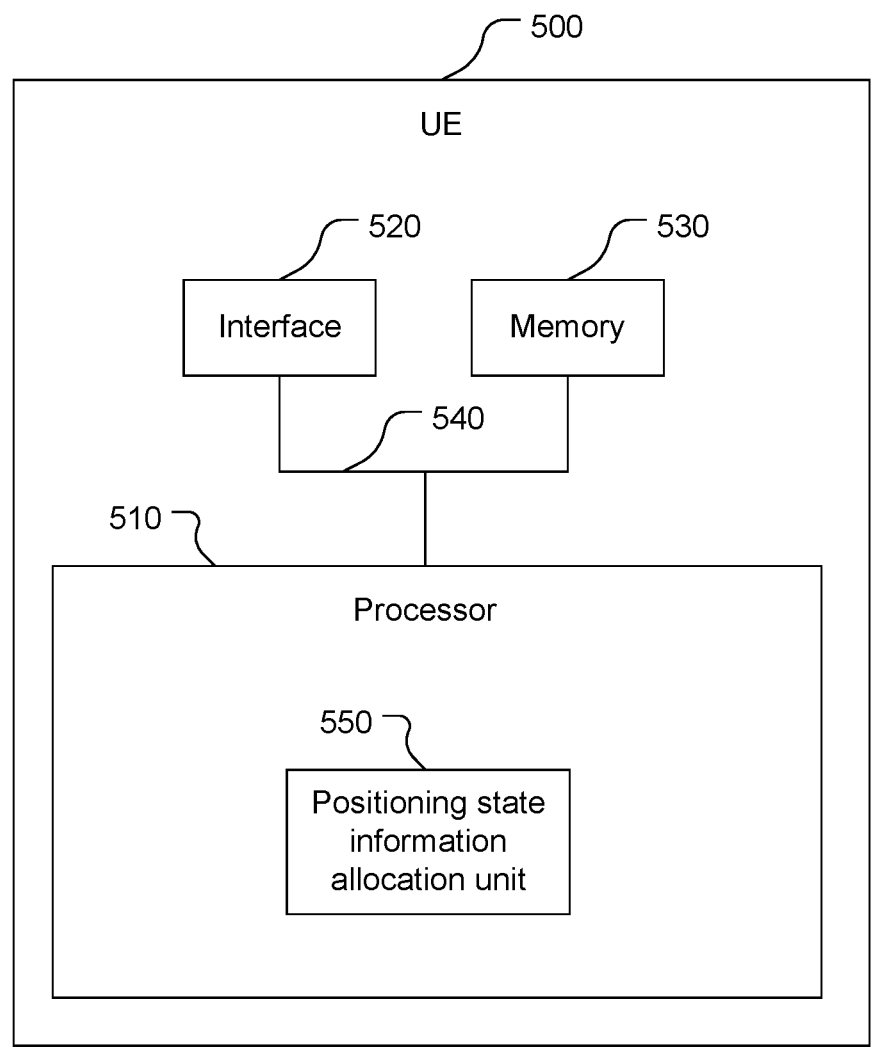
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include the components shown in FIG. 5, and may include one or more other components such as any of those shown in FIG. 2 such that the UE 200 may be an example of the UE 500. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions. The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a positioning state information allocation unit 550 configured to obtain a positioning state information resource allocation parameter, determine an amount of resources of a channel (e.g., a UE-transmitted channel such as PUSCH or PSSCH) for conveying positioning state information, and send the positioning state information over the UE-transmitted channel as discussed herein. While the PUSCH is used as an example, the discussion applies to other UE-transmitted channels including sidelink channels. The positioning state information includes information related to a position of the UE 500, e.g., information for use in determining the location of the UE such as one or more signal measurements (e.g., RSTD, RSRP, UE Rx-Tx), and/or a position fix estimate indicating the location of the UE 500. The PSI allocation unit 550 is discussed further below, and the description may refer to the processor 510 generally, or the UE 500 generally, as performing any of the functions of the PSI allocation unit 550.

Figure 6:
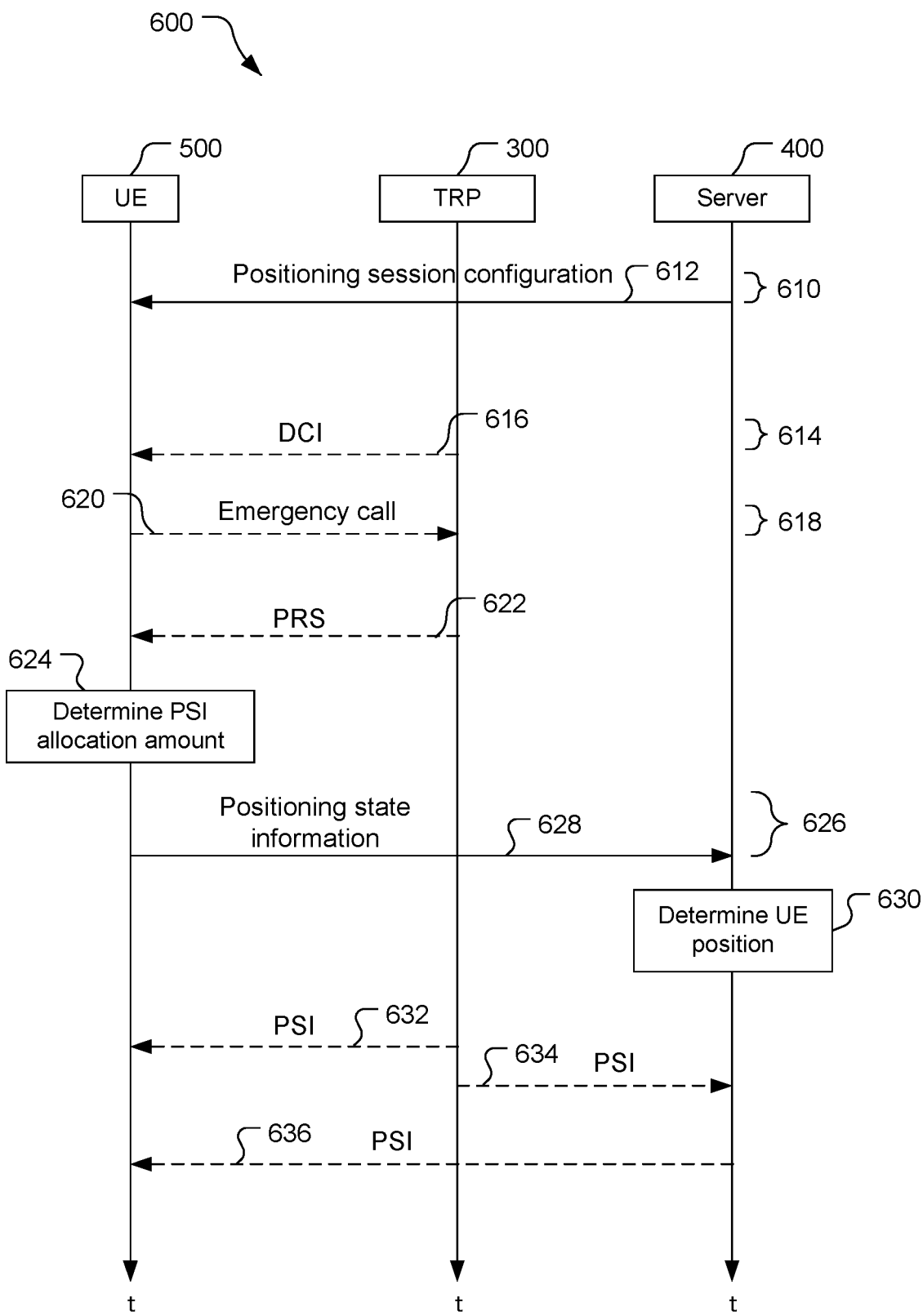
FIG. 6 is a signaling and process flow of allocating and sending positioning state information.

Referring also to FIG. 6, functionality of the positioning state information allocation unit 550 is discussed herein with reference to a signaling and process flow 600 for allocating UE-transmitted-channel resources to positioning state information and sending the positioning state information on the UE-transmitted channel for position determination. The flow 600 includes the stages shown but is an example only, as stages may be added, rearranged, and/or removed.

A variety of formats may be used for the positioning state information resource allocation parameter, referred to herein as a PSI (positioning state information) allocation parameter. For example, the PSI allocation parameter may indicate a percent of the UE-transmitted channel resource blocks (or resource elements) that may be used to convey positioning state information. As another example, the PSI allocation parameter may indicate a percent of the UE-transmitted-channel resource blocks (or resource elements) allocated for conveying UCI that may be used to convey positioning state information. As another example, the PSI allocation parameter may be a number that indicates a quantity of the UE-transmitted-channel resource blocks (or resource elements) that may be used to convey positioning state information. As another example, the PSI allocation parameter may be a variable of a formula for determining the amount of the UE-transmitted-channel resource blocks (or resource elements) that may be used to convey positioning state information. Still other examples of the form of the PSI allocation parameter are possible.

The positioning state information allocation unit 550 is configured to obtain the PSI allocation parameter. For example, the PSI allocation unit 550 may be configured to receive the PSI allocation parameter via the interface from a network entity such as the TRP 300 or the server 400 at stage 610. The server 400 may provide the PSI allocation parameter value to the UE 500 as part of positioning session configuration information 612 provided to the UE 500 to configure the UE 500 to report positioning state information, e.g., on the PUSCH, and/or as part of other configuration information, e.g., DCI 616 that may be dynamically sent at stage 614 to the UE 500 and that is separate from the configuration parameters configuring a particular positioning session. A dynamic PSI allocation parameter may help adapt to dynamic conditions such as emergency needs, changing quality of service (QOS) metrics, etc. The configuration information may specify one or more limitations for the use of the indicated PSI allocation parameter(s), e.g., that the indicated PSI allocation parameter(s) is(are) for a particular positioning session or particular position report, or for a specified amount of time, or to be used until further control information is received. A value of the PSI allocation parameter may depend on the configuration of the UE 500 for determining positioning state information, e.g., may depend on a positioning technique associated with the positioning state information (in this example, the positioning technique that the configuration information configures the UE 500 to perform to determine the positioning state information). Also or alternatively, the PSI allocation unit 550 may be configured to retrieve the PSI allocation parameter from the memory 530, and the memory 530 may store a single PSI allocation parameter or multiple PSI allocation parameters.

Figure 7:
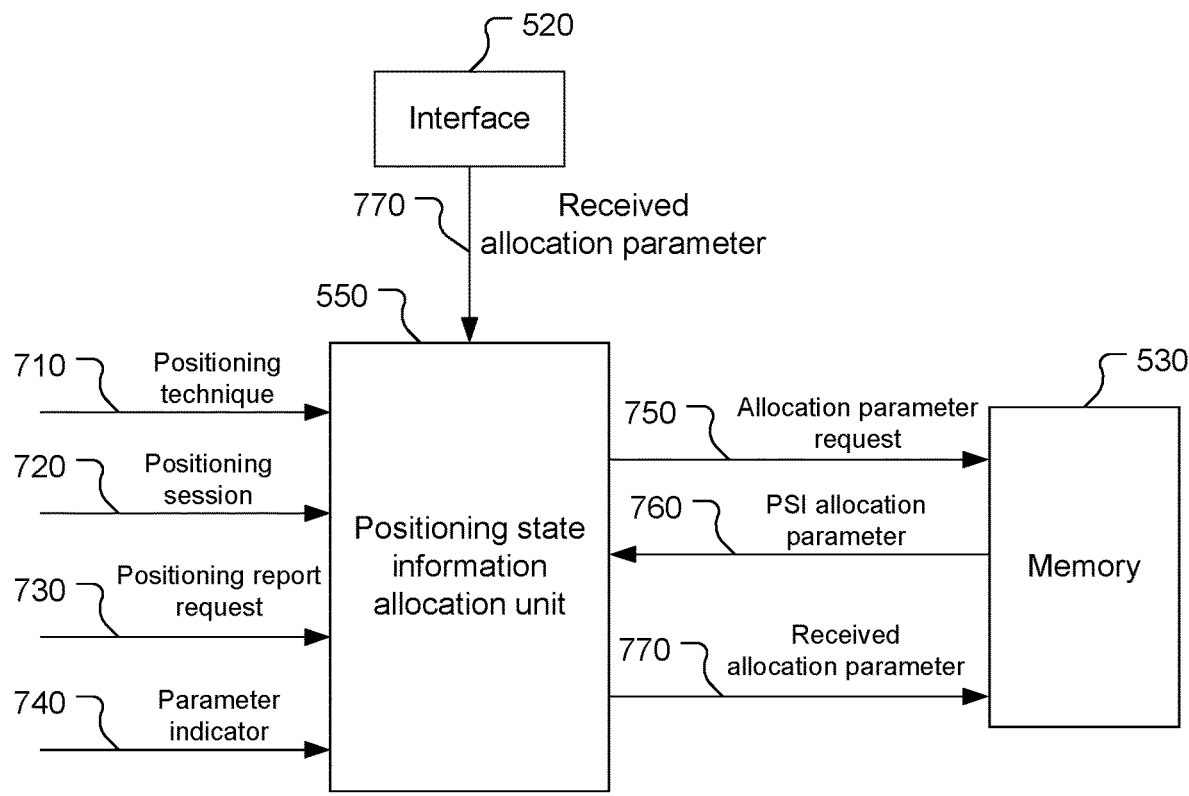
FIG. 7 is a simplified block diagram of retrieval of an allocation parameter from a memory shown in FIG. 5 and/or storage of a received allocation parameter in the memory.

Referring also to FIG. 7, the PSI allocation unit 550 may be configured to select and retrieve a particular PSI allocation parameter from multiple PSI allocation parameters stored in the memory 530. The PSI allocation unit 550 may be configured to use one or more of a positioning technique input 710, a positioning session input 720, a positioning report request 730, a parameter indicator 740, to produce an allocation parameter request 750. For example, the PSI allocation unit 550 may be configured to send the allocation parameter request 750 to the memory 530 to retrieve the particular PSI allocation parameter based on a positioning technique indicated by the positioning technique input 710 and associated with the positioning state information, e.g., the positioning technique to be used by the processor 510 to determine the positioning state information. The positioning technique to be used may be determined, for example, by control information received by the UE 500 or by a scenario such as a type of positioning session (e.g., a positioning session for an emergency call, e.g., as initiated at stage 618 with a request 620 to the TRP 300). The positioning technique input 710 may be indicated by the control information, or determined by the processor 510 from the control information. Different types of positioning sessions (and corresponding positioning methods) may be more important than other types of sessions, and thus the PSI allocation parameter may allocate more resources to more important positioning sessions. As another example, the PSI allocation unit 550 may be configured to retrieve the particular PSI allocation parameter based on the positioning report request 730, where a positioning report may be requested or instructed by control information received by the UE 500. Also or alternatively, the PSI allocation unit 550 may be configured to retrieve the particular PSI allocation parameter based on the parameter indicator 740, which may be received by the UE 500, e.g., as part of control information such as in dynamically-sent DCI (downlink control information). The parameter indicator 740 may be, for example, an ID of the PSI allocation parameter or an index value. For example, the memory 530 may store a quantity N of PSI allocation parameters and the parameter indicator may indicate to use the $M^{th}$ PSI allocation parameter of the N available PSI allocation parameters. The memory 530 is configured to return a PSI allocation parameter 760 to the PSI allocation unit 550 in response to (corresponding to and/or indicated by) the allocation parameter request 750. The PSI allocation unit 550 may be configured to add a received PSI allocation parameter 770 to the stored PSI allocation parameters in the memory 530, e.g., if the received PSI allocation parameter is a new PSI allocation parameter (i.e., not already one of the PSI allocation parameters stored in the memory 530).

The PSI allocation unit 550 may obtain separate PSI allocation parameters for separate portions of the positioning state information. Thus, a PSI allocation parameter for the positioning state information may comprise a combination of PSI allocation sub-parameters corresponding to portions of the positioning state information. Using separate PSI allocation parameters for different parts of the positioning state information may help accommodate differences in importance of positioning state information reports. Positioning reports that are more important may be allocated more resources, e.g., to provide more information such as better resolution. For example, the PSI allocation unit 550 may obtain each of the separate PSI allocation parameters using any of the techniques discussed above. As another example, the PSI allocation unit 550 may use one or more CSI beta values as one or more PSI allocation parameters. Different CSI types and/or parts may have separate (possibly different) associated beta values. The PSI allocation unit 550 may, for example, obtain the beta value for CSI part 1 and use this as the PSI allocation parameter for a PSI part 1 and obtain the beta value for CSI part 2 and use this as the PSI allocation parameter for a PSI part 2. The PSI allocation unit 550 may, as another example, obtain the beta value for CSI part 1 (or CSI part 2) and use this as the PSI allocation parameter for both PSI part 1 and PSI part 2. The PSI allocation unit 550 may be configured always to use a CSI beta value as a PSI allocation parameter. Alternatively, the PSI allocation unit 550 may be configured to use a CSI beta value as a PSI allocation parameter as a default if a PSI allocation parameter is not provided.

The PSI allocation unit 550 is further configured to determine, at stage 624 and based on the PSI allocation parameter 760 (which may be a combination of sub-parameters), an amount of resources of a UE-transmitted channel that may be used for conveying the positioning state information. For example, the PSI allocation unit 550 may use the PSI allocation parameter 760 as an input to a formula and calculate the formula with the PSI allocation parameter 760 to determine the amount of resources to which positioning state information may be mapped over the UE-transmitted channel, e.g., the PUSCH. Also or alternatively, the PSI allocation unit 550 may read the PSI allocation parameter 760 as a quantity of resources (e.g., resource blocks) that may be used, or may determine an amount of resources as a percent of PUSCH resources (or as a percent of UCI resources of the PUSCH resources) as indicated by the PSI allocation parameter 760. Different amounts of resources for conveying positioning state information may be allocated by the PSI allocation unit 550 based on different scenarios (such as different positioning sessions, different positioning reports, etc.). The different amounts of resources may be determined by the PSI allocation unit 550 based on different PSI allocation parameters 760 (i.e., different parameter values), with the PSI allocation parameters 760 dictated by (dependent on) the different scenarios. Alternatively, the PSI allocation unit 550 may be configured to apply the same PSI allocation parameter 760 (or different PSI allocation parameters 760) to different formulas corresponding to different scenarios in order to determine the resources to allocate for different scenarios, which may result in different amounts of resources allocated to positioning state information for different scenarios. The PSI allocation unit 550 may determine amounts of resources corresponding to separate portions of the positioning state information, using separate PSI allocation parameters 760 and/or separate formulas for calculating the amounts of resources as appropriate (e.g., as available).

The PSI allocation unit 550 is further configured to send the positioning state information 628 at stage 626 to a network entity, here the server 400 that determines the position of the UE 500 at stage 630 using the positioning state information. The processor 510 may determine positioning state information (e.g., by measuring PRS 622 sent from the TRP 300 to the UE 500, or by producing SRS). The PSI allocation unit 550 may be configured to send the positioning state information over the UE-transmitted channel, with the positioning state information occupying no more than the determined positioning resource amount, i.e., the determined (based on the PSI allocation parameter 760) amount of positioning resources for conveying the positioning state information. The PSI allocation unit 550 may be configured to map the positioning state information to resource elements of the UE-transmitted channel with the determined positioning resource amount as a constraint on the number of resource elements to which the positioning state information may be mapped.

The PSI allocation unit 550 may be configured to send the PSI concatenated to CSI. In this way, the CSI report would be longer than without the PSI, but there would not be a separate report for the PSI. For example, the PSI allocation unit 550 may be configured to concatenate the PSI to CSI type 1 and/or CSI type 2. The PSI allocation unit 550 may be configured to concatenate the PSI to one part only (e.g., part 2) of CSI having multiple parts, or may be configured to split the PSI and concatenate respective portions of the PSI to respective portions (e.g., a fixed-payload part and a variable-payload part) of the CSI. For example, the portion of the PSI concatenated to part 1 of the CSI may indicate that part 2 of the CSI includes more (has more bits) than just CSI, and may indicate the amount of PSI concatenated to the CSI part 2. The PSI could be part of the CSI type 1 payload (e.g., if there are less than a threshold amount of PSI bits, or if the PSI is a position fix, or the PSI is single-position reporting)), and otherwise be part of CSI type 2 payload (e.g., for multiple-position reporting).

The PSI allocation unit 550 may be configured to send the positioning state information in accordance with a priority given to the PSI relative to CSI and HARQ. Traditionally, priority for UCI is given to HARQ first, then CSI type 1, then CSI type 2. The priority of the positioning state information may be higher than CSI type 1, or between CSI type 1 and CSI type 2, or below CSI type 2. The PSI allocation unit 550 may be configured such that the priority of the positioning state information is always lower than HARQ, as ACK/NACK (acknowledgement/negative acknowledgement) is always more important than positioning state information and is only one bit (compared to many bits for positioning state information). The PSI allocation unit 550 may accommodate different priorities of positioning state information, e.g., giving positioning state information for an emergency call higher priority than for a non-emergency call. The PSI allocation unit 550 may be configured to determine priority based on one or more criteria such as a positioning method used to determine the positioning state information and/or content of the positioning method (e.g., type of measurement), and/or one or more other criteria.

Figure 8:
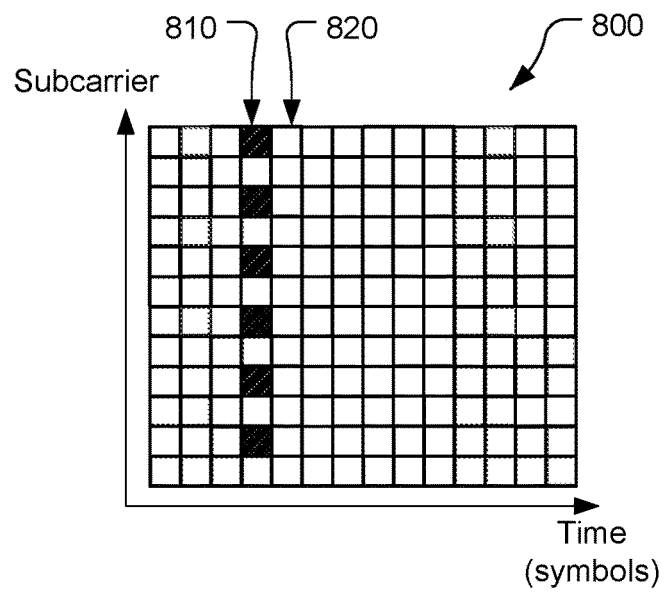
FIG. 8 is a simplified diagram of a slot of control information including a reference signal.

Prioritization may be reflected by proximity (in time and/or frequency) to DMRS symbols when placing UCI onto PUSCH symbols and the possibility of being over-written by other UCI types. Being closer to DMRS symbols typically results in better performance (higher quality and accuracy of transmission) and decreasing proximity results in decreasing expectation of channel estimation accuracy because the channel de-correlates with decreasing proximity because the DMRS are used for channel estimation. The highest-proximity REs are those in the same symbol as the DMRS. Thus, for example, referring also to FIG. 8 that shows resource elements of a slot 800, if the DMRS is transmitted in a symbol 810 (with DMRS REs shown as black boxes), then high-priority PSI may be sent in the symbol 810, and/or may be sent in the symbol 820 adjacent to (nearest in time to) the symbol 810. Transmission in one or both of these symbols is an example, however, and not required. The priority of the PSI may be dictated by (dependent on) a protocol, for example by a positioning session (e.g., QoS metrics of the positioning session). The priority may be configurable, e.g., through configuration parameters sent by the server 400.

The PSI allocation unit 550 may be configured to prevent positioning state information, or at least a subset of the positioning state information, from being mapped to certain resource elements of the UE-transmitted channel, e.g., the PUSCH or the PSSCH. For example, the PSI allocation unit 550 may be configured not to map positioning state information to any resource element designated for HARQ, and/or for CSI type 1, and/or for CSI type 2. This may prevent, for example, positioning state information from being punctured (e.g., overwritten) by HARQ. The PSI allocation unit 550 may be configured not to map a subset of the positioning state information to one or more of certain resource elements. The subset of the positioning state information may be, for example, a part 1 of positioning state information, a position fix estimate, an indication of a reference TRP (e.g., a TRP ID of the reference TRP), and/or one or more specific measurements (e.g., RSTD). The certain resource elements not mapped to may be, for example, all resource elements in the same symbol as DMRS. The certain resource elements may be any selected resource elements generally, or may be resource elements designated for particular content (e.g., HARQ, CSI type 1, CSI type 2, etc.).

The UE 500 may repeatedly obtain the PSI allocation parameter, determine PSI allocation, and send the PSI to the network entity. For example, the flow 600 may return to stage 610, 614, or 618 in response to a new positioning session being configured, dynamic DCI being received, or an emergency call being initiated. Also or alternatively, the flow 600 (or portions thereof) may repeat in response to some other event not shown that triggers re-obtaining a PSI allocation parameter, re-determining PSI allocation, and/or re-sending (including re-mapping as appropriate) the PSI.

The TRP 300 and/or the server 400 may each send PSI to one or more other entities. For example, the TRP 300 may send, as controlled by the PSI allocation unit 360, PSI 632 to the UE 500 over a physical downlink channel and/or PSI 634 to the server 400 over a physical uplink channel. The server 400 may send, as controlled by the PSI allocation unit 460, PSI 636 to the UE 500 over a physical downlink channel.

Operation

Figure 9:
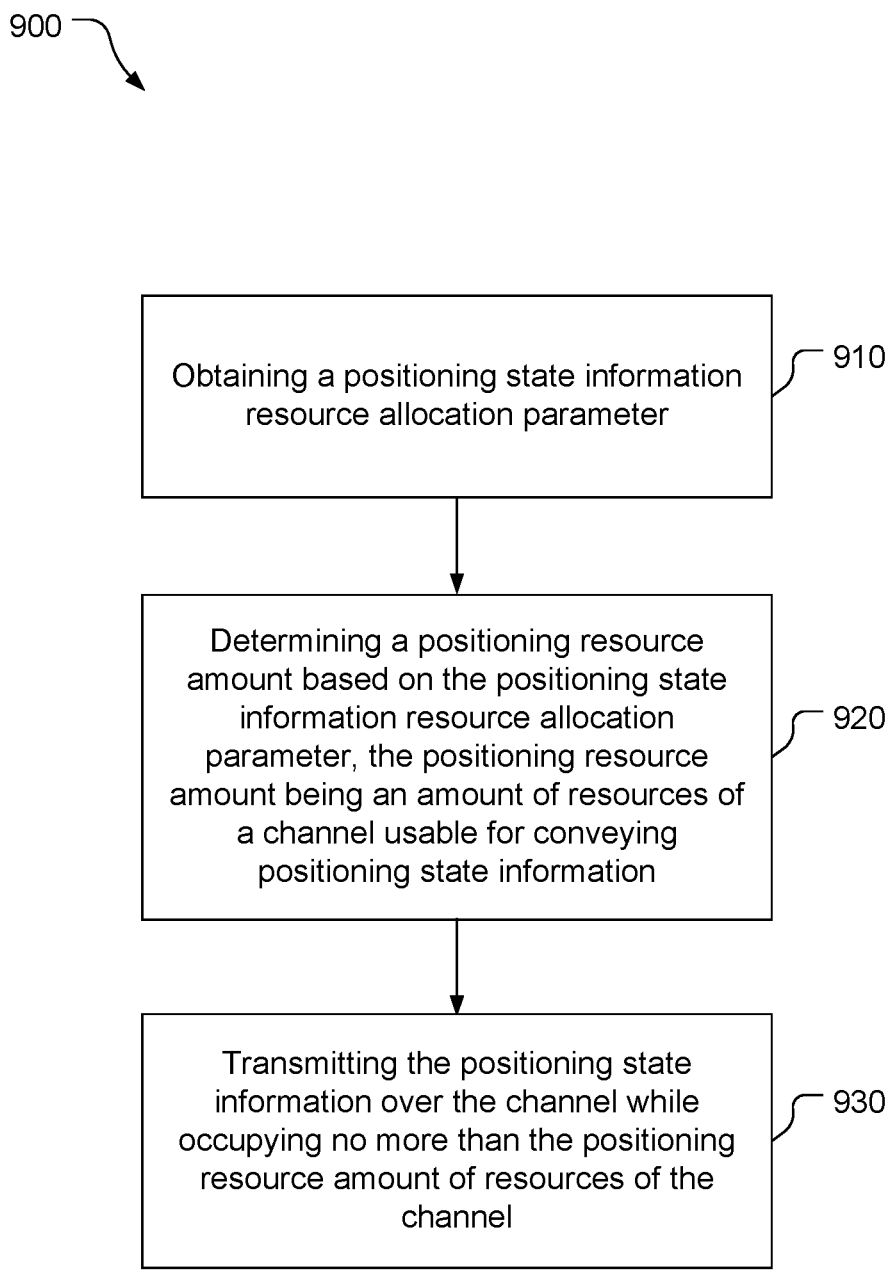
FIG. 9 is a block flow diagram of a method of providing positioning state information.

Referring to FIG. 9, with further reference to FIGS. 1-8, a method 900 of providing positioning state information in a channel usable for conveying positioning state information includes the stages shown. The method 900 is, however, an example only and not limiting. The method 900 may be altered, e.g., by having stages added, removed, rearranged, combined, performed concurrently, and/or having single stages split into multiple stages. While examples of the method 900 are discussed as occurring at a UE, the method 900 may be performed at other entities, e.g., at a network entity such as a TRP or a server.

At stage 910, the method 900 includes obtaining a positioning state information resource allocation parameter. For example, the PSI resource allocation parameter may be obtained by a UE. The processor 510 may receive the PSI resource allocation parameter (i.e., the PSI allocation parameter for short) from a network entity (e.g., the TRP 300 or the server 400) or may retrieve the PSI allocation parameter from the memory 530 (e.g., as programmed during manufacture, stored based on received information from a network entity, etc.). The processor 510 may retrieve the PSI allocation parameter from among multiple PSI allocation parameters stored in the memory 530. For example, the processor 510 may select the PSI allocation parameter to retrieve based on a positioning method for producing the PSI (e.g., a positioning method to be implemented by the user equipment to produce the PSI). The positioning method may, for example, be dictated by control information (e.g., DCI) received by the UE 500, or selected by the processor 510 based on a scenario for the positioning (e.g., an emergency call). The PSI resource allocation parameter may be retrieved based on received control information. The positioning state information resource allocation parameter may correspond to all of the positioning state information to be transmitted, or a portion thereof (e.g., a part 1 or part 2 of the positioning state information). The PSI allocation parameter may be a single parameter or multiple parameters (e.g., multiple parameters each corresponding to a portion of the PSI with or without another parameter corresponding to all of the PSI (e.g., corresponding to a total amount of UE-transmitted-channel resources for positioning state information)). For example, obtaining the PSI allocation parameter may comprise obtaining a first PSI allocation sub-parameter and a second PSI allocation sub-parameter. A first CSI resource allocation sub-parameter (e.g., corresponding to a part 1 of the CSI) may be used as the first PSI allocation sub-parameter and a second CSI resource allocation sub-parameter (e.g., corresponding to a part s of the CSI) may be used as the second PSI allocation sub-parameter. The first and second CSI resource allocation sub-parameters correspond to amounts of resources of the channel that are usable for conveying first and second portions of the CSI. As another example, the first CSI resource allocation sub-parameter (or the second CSI resource allocation sub-parameter) may be used for both the first and second PSI allocation sub-parameters. The processor 510 along with the memory 530 and possibly the interface 520 (e.g., the wireless receiver 244 and the antenna 246 and/or the wired receiver 254) may comprise means for obtaining a positioning state information resource allocation parameter. Also or alternatively, the processor 310 along with the memory 311 and possibly the transceiver 315 (e.g., the wireless receiver 344 and the antenna 346 and/or the wired receiver 354) may comprise means for obtaining a positioning state information resource allocation parameter. Also or alternatively, the processor 410 along with the memory 411 and possibly the transceiver 415 (e.g., the wireless receiver 444 and the antenna 446 and/or the wired receiver 454) may comprise means for obtaining a positioning state information resource allocation parameter.

At stage 920, the method 900 includes determining a positioning resource amount based on the positioning state information resource allocation parameter, the positioning resource among being an amount of resources of a channel usable for conveying positioning state information. The channel may be an uplink channel, a sidelink channel, or a downlink channel. For example, a UE may determine the positioning resource amount for a UE-transmitted channel. The processor 510 may use a percentage or quantity indicated by the PSI allocation parameter to determine the positioning resource amount. As another example, the processor 510 may use the PSI allocation parameter in a formula to determine the positioning resource amount. If multiple PSI allocation sub-parameters are obtained, then the processor may determine multiple resource allocation sub-amounts may be determined accordingly, e.g., as percentages, as quantities, as inputs to one or more formulas, etc. The determined resource allocation amount(s) may be relative to the UE-transmitted-channel resources or relative to the UE-transmitted-channel resources determined for control information, etc. The processor 510 along with the memory 530 may comprise means for determining a positioning resource amount. Also or alternatively, the processor 310 along with the memory 311 may comprise means for determining a positioning resource amount. Also or alternatively, the processor 410 along with the memory 411 may comprise means for determining a positioning resource amount.

At stage 930, the method 900 includes transmitting the positioning state information over the channel while occupying no more than the positioning resource amount of resources of the channel. For example, a UE may send the PSI to a network entity (e.g., a TRP or server) over a UE-transmitted channel, or a network entity may send PSI to another network entity or to a UE. The processor 510 may send the PSI over the PUSCH with the PSI mapped to no more of the REs of the PUSCH than allowed according to the determined positioning resource amount. If multiple PSI allocation sub-parameters were obtained and multiple positioning resource sub-amounts determined, then respective portions of the positioning state information may be sent over the UE-transmitted channel mapped to no more of the REs of the UE-transmitted channel than allowed according to the respective positioning resource sub-amounts. The processor 510 may send the PSI by concatenating the PSI to channel state information (CSI), e.g., CSI type 1 or CSI type 2. The processor 510 may send separate portions of the PSI concatenated to respective portions of the CSI (e.g., fixed and variable payload portions of the CSI). The processor 510 may send the PSI to the network entity according to a priority of the PSI relative to other information. The processor 510 may send the PSI to the network entity with a proximity, in the channel, to a reference signal (e.g., a DMRS signal) based on control information associated with the PSI and/or a quality of service associated with the PSI and/or a positioning method associated with the PSI. The quality of service may comprise metrics that transmission of the PSI are to meet. The positioning method may be the positioning method used by the processor 510 to produce the PSI, or the positioning method that the PSI may be used in (e.g., the positioning method associated with the measurement type of the PSI). The processor 510 along with the memory 530 and possibly the interface 520 may comprise means for transmitting the positioning state information. Also or alternatively, the processor 310 along with the memory 311 and possibly the transceiver 315 (e.g., the wireless transmitter 342 and the antenna 346) may comprise means for transmitting the positioning state information. Also or alternatively, the processor 410 along with the memory 411 and possibly the transceiver 415 (e.g., the wireless transmitter 442 and the antenna 446) may comprise means for transmitting the positioning state information.

Implementations of the method 900 may include one or more of the following features. In an example implementation, transmitting the PSI may include transmitting the PSI without mapping at least a portion of the PSI to any resource element designated for conveying HARQ. The at least a portion of the PSI may include a fixed-payload portion of the positioning state information, a positioning fix estimate (e.g., for the user equipment), a reference transmission/reception point identification, or a positioning measurement (e.g., RSRP, RSTD, $UE_{Rx-Tx}$). In another example implementation, the method 900 may include receiving a new positioning state information resource allocation parameter from a control signal, and adding the new positioning state information resource allocation parameter to the plurality of positioning state information resource allocation parameters in the memory. The control signal may be a wireless control signal (e.g., received by a UE) or a wired control signal (e.g., received by a TRP). The processor 510, possibly in combination with the memory 530, in combination with the interface 520 (e.g., the wireless receiver 244 and the antenna 246, and/or the wired receiver 254) may comprise means for receiving the new PSI resource allocation parameter. The processor 510, in combination with the memory 530, may comprise means for adding the new PSI resource allocation parameter to memory. The processor 310, possibly in combination with the memory 311, in combination with the transceiver 315 (e.g., the wireless receiver 344 and the antenna 346, and/or the wired receiver 354) may comprise means for receiving the new PSI resource allocation parameter. The processor 310, in combination with the memory 311, may comprise means for adding the new PSI resource allocation parameter to memory.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

As used herein, unless otherwise stated, a statement that a function or operation is "based on" an item or condition means that the function or operation is based on the stated item or condition and may be based on one or more items and/or conditions in addition to the stated item or condition.

Components, functional or otherwise, shown in the figures and/or discussed herein as being connected or communicating with each other are communicatively coupled unless otherwise noted. That is, they may be directly or indirectly connected to enable communication between them.

"About" and/or "approximately" and/or "substantially" as used herein when referring to a measurable value such as an amount, a temporal duration, an attribute (such as a frequency or size), or the like, may encompass (in addition to any variation specified) variations of ±20% or ±10%, ±5%, or ±0.1% from the specified value, as appropriate in the context of the systems, devices, circuits, methods, or other implementations described herein.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used without departing from the scope of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A device capable of wireless communication, the device comprising:
   a transmitter configured to transmit outbound signals wirelessly;
   a memory; and
   a processor communicatively coupled to the memory and the transmitter, the processor being configured to:
      obtain a positioning state information resource allocation parameter;
      determine a positioning resource amount based on the positioning state information resource allocation parameter, the positioning resource amount being an amount of resources of a channel usable for conveying positioning state information; and
      transmit the positioning state information, via the transmitter over the channel, occupying no more than the positioning resource amount of resources of the channel;
   wherein to obtain the positioning state information resource allocation parameter the processor is configured to:
      obtain a first positioning state information resource allocation sub-parameter; and obtain a second positioning state information resource allocation sub-parameter;
wherein to determine the positioning resource amount the processor is configured to:
  determine, based on the first positioning state information resource allocation sub-parameter, a first positioning resource sub-amount of resources of the channel; and
  determine, based on the second positioning state information resource allocation sub-parameter, a second positioning resource sub-amount of resources of the channel; and
wherein to transmit the positioning state information the processor is configured to:
  transmit a first portion of the positioning state information occupying no more than the first positioning resource sub-amount of resources of the channel; and
  transmit a second portion of the positioning state information occupying no more than the second positioning resource sub-amount of resources of the channel.

2. The device of claim 1, wherein the positioning state information resource allocation parameter is a selected parameter, and wherein the processor is configured to retrieve the selected parameter from a plurality of positioning state information resource allocation parameters stored in the memory.

3. The device of claim 2, wherein the processor is configured to retrieve the selected parameter based on a positioning method associated with the positioning state information.

4. The device of claim 2, further comprising a receiver communicatively coupled to the processor and configured to receive inbound signals, and wherein the processor is configured to retrieve the selected parameter based on control information received by the processor via the receiver.

5. The device of claim 2, further comprising a receiver communicatively coupled to the processor and configured to receive inbound signals, and wherein the processor is configured to add a new positioning state information resource allocation parameter, from a control signal received by the processor via the receiver, to the plurality of positioning state information resource allocation parameters stored in the memory.

6. The device of claim 1, wherein the processor is configured to use a first channel state information resource allocation sub-parameter as the first positioning state information resource allocation sub-parameter and to use a second channel state information resource allocation sub-parameter as the second positioning state information resource allocation sub-parameter, and wherein the first channel state information resource allocation sub-parameter corresponds to an amount of resources of the channel usable for conveying a first portion of channel state information and the second channel state information resource allocation sub-parameter corresponds to an amount of resources of the channel usable for conveying a second portion of the channel state information.

7. The device of claim 1, wherein the processor is configured to use a first channel state information resource allocation sub-parameter as the first positioning state information resource allocation sub-parameter and as the second positioning state information resource allocation sub-parameter, and wherein the first channel state information resource allocation sub-parameter corresponds to an amount of resources of the channel usable for conveying a first portion of channel state information and a second channel state information resource allocation sub-parameter corresponds to an amount of resources of the channel usable for conveying a second portion of the channel state information.

8. The device of claim 1, wherein to transmit the positioning state information the processor is configured to concatenate the positioning state information to channel state information.

9. The device of claim 8, wherein to concatenate the positioning state information to the channel state information the processor is configured to concatenate a first portion of the positioning state information to a first portion of the channel state information and to concatenate a second portion of the positioning state information to a second portion of the channel state information.

10. The device of claim 1, wherein the processor is configured to transmit the positioning state information with a proximity, in the channel, to a reference signal based on at least one of control information associated with the positioning state information, or a quality of service associated with the positioning state information, or a positioning method associated with the positioning state information.

11. The device of claim 1, wherein the processor is configured to transmit the positioning state information without mapping at least a portion of the positioning state information to any resource element designated for conveying a hybrid automatic repeat request.

12. The device of claim 11, wherein the at least a portion of the positioning state information comprises a fixed-payload portion of the positioning state information, a positioning fix estimate, a reference transmission/reception point identification, or a positioning measurement.

13. The device of claim 1, wherein the channel usable for conveying the positioning state information is a physical uplink shared channel (PUSCH), a physical downlink shared channel (PDSCH), or a physical sidelink shared channel (PSSCH).

14. A device capable of wireless communication, the device comprising:
  obtaining means for obtaining a positioning state information resource allocation parameter;
  determining means for determining a positioning resource amount based on the positioning state information resource allocation parameter, the positioning resource amount being an amount of resources of a channel usable for conveying positioning state information; and
  transmitting means for transmitting the positioning state information over the channel while occupying no more than the positioning resource amount of resources of the channel;
  wherein the obtaining means comprise:
    means for obtaining a first positioning state information resource allocation sub-parameter; and
    means for obtaining a second positioning state information resource allocation sub-parameter;
  wherein the determining means comprise:
    means for determining, based on the first positioning state information resource allocation sub-parameter, a first positioning resource sub-amount of resources of the channel; and
    means for determining, based on the second positioning state information resource allocation sub-parameter, a second positioning resource sub-amount of resources of the channel; and
  wherein the transmitting means comprise:
    means for transmitting a first portion of the positioning state information occupying no more than the first positioning resource sub-amount of resources of the channel; and means for transmitting a second portion of the positioning state information occupying no more than the second positioning resource sub-amount of resources of the channel.

15. The device of claim 14, further comprising storing means for storing a plurality of positioning state information resource allocation parameters, wherein the positioning state information resource allocation parameter is a selected parameter, and wherein the obtaining means are for retrieving the selected parameter from the plurality of positioning state information resource allocation parameters in the storing means.

16. The device of claim 15, wherein the obtaining means comprise means for retrieving the selected parameter based on a positioning method for deriving the positioning state information.

17. The device of claim 15, wherein the obtaining means comprise means for receiving control information and for retrieving the selected parameter based on the control information.

18. The device of claim 15, wherein the obtaining means comprise means for receiving a new positioning state information resource allocation parameter from a control signal and for adding the new positioning state information resource allocation parameter to the plurality of positioning state information resource allocation parameters in the storing means.

19. The device of claim 14, wherein the obtaining means comprise means for using a first channel state information resource allocation sub-parameter as the first positioning state information resource allocation sub-parameter and for using a second channel state information resource allocation sub-parameter as the second positioning state information resource allocation sub-parameter, and wherein the first channel state information resource allocation sub-parameter corresponds to an amount of resources of the channel usable for conveying a first portion of channel state information and the second channel state information resource allocation sub-parameter corresponds to an amount of resources of the channel usable for conveying a second portion of the channel state information.

20. The device of claim 14, wherein the obtaining means comprise means for using a first channel state information resource allocation sub-parameter as the first positioning state information resource allocation sub-parameter and as the second positioning state information resource allocation sub-parameter, and wherein the first channel state information resource allocation sub-parameter corresponds to an amount of resources of the channel usable for conveying a first portion of channel state information and a second channel state information resource allocation sub-parameter corresponds to an amount of resources of the channel usable for conveying a second portion of the channel state information.

21. The device of claim 14, wherein the transmitting means comprise means for concatenating the positioning state information to channel state information.

22. The device of claim 21, wherein the transmitting means comprise means for concatenating a first portion of the positioning state information to a first portion of the channel state information and for concatenating a second portion of the positioning state information to a second portion of the channel state information.

23. The device of claim 14, wherein the transmitting means comprise means for transmitting the positioning state information with a proximity, in the channel, to a reference signal based on at least one of control information associated with the positioning state information, or a quality of service associated with the positioning state information, or a positioning method associated with the positioning state information.

24. The device of claim 14, wherein the transmitting means comprise means for transmitting the positioning state information without mapping at least a portion of the positioning state information to any resource element designated for conveying a hybrid automatic repeat request.

25. The device of claim 24, wherein the at least a portion of the positioning state information comprises a fixed-payload portion of the positioning state information, a positioning fix estimate, a reference transmission/reception point identification, or a positioning measurement.

26. A method of providing positioning state information in a channel usable for conveying the positioning state information, the method comprising:
obtaining a positioning state information resource allocation parameter;
determining a positioning resource amount based on the positioning state information resource allocation parameter, the positioning resource amount being an amount of resources of the channel usable for conveying the positioning state information; and
transmitting the positioning state information over the channel while occupying no more than the positioning resource amount of resources of the channel;
wherein obtaining the positioning state information resource allocation parameter comprises:
obtaining a first positioning state information resource allocation sub-parameter; and
obtaining a second positioning state information resource allocation sub-parameter;
wherein determining the positioning resource amount comprises:
determining, based on the first positioning state information resource allocation sub-parameter, a first positioning resource sub-amount of resources of the channel; and
determining, based on the second positioning state information resource allocation sub-parameter, a second positioning resource sub-amount of resources of the channel; and
wherein transmitting the positioning state information comprises:
transmitting a first portion of the positioning state information occupying no more than the first positioning resource sub-amount of resources of the channel; and
transmitting a second portion of the positioning state information occupying no more than the second positioning resource sub-amount of resources of the channel.

27. The method of claim 26, wherein the positioning state information resource allocation parameter is a selected parameter, and wherein obtaining the positioning state information resource allocation parameter comprises retrieving the selected parameter from a plurality of positioning state information resource allocation parameters stored in a memory.

28. The method of claim 27, wherein retrieving the selected parameter is based on a positioning method for deriving the positioning state information.

29. The method of claim 27, further comprising receiving control information, wherein retrieving the selected parameter is based on the control information.

30. The method of claim 27, further comprising:
receiving a new positioning state information resource allocation parameter from a control signal; and
adding the new positioning state information resource allocation parameter to the plurality of positioning state information resource allocation parameters in the memory.

31. The method of claim 26, wherein obtaining the positioning state information resource allocation parameter comprises using a first channel state information resource allocation sub-parameter as the first positioning state information resource allocation sub-parameter and using a second channel state information resource allocation sub-parameter as the second positioning state information resource allocation sub-parameter, and wherein the first channel state information resource allocation sub-parameter corresponds to an amount of resources of the channel usable for conveying a first portion of channel state information and the second channel state information resource allocation sub-parameter corresponds to an amount of resources of the channel usable for conveying a second portion of the channel state information.

32. The method of claim 26, wherein obtaining the positioning state information resource allocation parameter comprises using a first channel state information resource allocation sub-parameter as the first positioning state information resource allocation sub-parameter and as the second positioning state information resource allocation sub-parameter, and wherein the first channel state information resource allocation sub-parameter corresponds to an amount of resources of the channel usable for conveying a first portion of channel state information and a second channel state information resource allocation sub-parameter corresponds to an amount of resources of the channel usable for conveying a second portion of the channel state information.

33. The method of claim 26, wherein transmitting the positioning state information comprises concatenating the positioning state information to channel state information.

34. The method of claim 33, wherein concatenating the positioning state information to the channel state information comprises concatenating a first portion of the positioning state information to a first portion of the channel state information and concatenating a second portion of the positioning state information to a second portion of the channel state information.

35. The method of claim 26, wherein transmitting the positioning state information comprises transmitting the positioning state information with a proximity, in the channel, to a reference signal based on at least one of control information associated with the positioning state information, or a quality of service associated with the positioning state information, or a positioning method associated with the positioning state information.

36. The method of claim 26, wherein transmitting the positioning state information comprises transmitting the positioning state information without mapping at least a portion of the positioning state information to any resource element designated for conveying a hybrid automatic repeat request.

37. The method of claim 36, wherein the at least a portion of the positioning state information comprises a fixed-payload portion of the positioning state information, a positioning fix estimate, a reference transmission/reception point identification, or a positioning measurement.

38. A non-transitory, processor-readable storage medium comprising processor-readable instructions configured to cause a processor of a device to:
obtain a positioning state information resource allocation parameter;
determine a positioning resource amount based on the positioning state information resource allocation parameter, the positioning resource amount being an amount of resources of a channel usable for conveying positioning state information; and
transmit the positioning state information over the channel while occupying no more than the positioning resource amount of resources of the channel;
wherein the processor-readable instructions configured to cause the processor to obtain the positioning state information resource allocation parameter comprise processor-readable instructions configured to cause the processor to:
obtain a first positioning state information resource allocation sub-parameter; and
obtain a second positioning state information resource allocation sub-parameter;
wherein the processor-readable instructions configured to cause the processor to determine the positioning resource amount comprise processor-readable instructions configured to cause the processor to:
determine, based on the first positioning state information resource allocation sub-parameter, a first positioning resource sub-amount of resources of the channel; and
determine, based on the second positioning state information resource allocation sub-parameter, a second positioning resource sub-amount of resources of the channel; and
wherein the processor-readable instructions configured to cause the processor to transmit the positioning state information comprise processor-readable instructions configured to cause the processor to:
transmit a first portion of the positioning state information occupying no more than the first positioning resource sub-amount of resources of the channel; and
transmit a second portion of the positioning state information occupying no more than the second positioning resource sub-amount of resources of the channel.

39. The storage medium of claim 38, wherein the positioning state information resource allocation parameter is a selected parameter, and wherein the storage medium comprises processor-readable instructions configured to cause the processor to retrieve the selected parameter from a plurality of positioning state information resource allocation parameters stored in a memory of the device.

40. The storage medium of claim 39, wherein the storage medium comprises processor-readable instructions configured to cause the processor to retrieve the selected parameter based on a positioning method associated with the positioning state information.

41. The storage medium of claim 39, wherein the storage medium comprises processor-readable instructions configured to cause the processor to retrieve the selected parameter based on control information received by the device.

42. The storage medium of claim 39, wherein the storage medium comprises processor-readable instructions configured to cause the processor to add a new positioning state information resource allocation parameter, from a control signal received by the device, to the plurality of positioning state information resource allocation parameters stored in the memory of the device.

43. The storage medium of claim 38, wherein the storage medium comprises processor-readable instructions configured to cause the processor to use a first channel state information resource allocation sub-parameter as the first positioning state information resource allocation sub-parameter and to use a second channel state information resource allocation sub-parameter as the second positioning state information resource allocation sub-parameter, and wherein the first channel state information resource allocation sub-parameter corresponds to an amount of resources of the channel usable for conveying a first portion of channel state information and the second channel state information resource allocation sub-parameter corresponds to an amount of resources of the channel usable for conveying a second portion of the channel state information.

44. The storage medium of claim 38, wherein the storage medium comprises processor-readable instructions configured to cause the processor to use a first channel state information resource allocation sub-parameter as the first positioning state information resource allocation sub-parameter and as the second positioning state information resource allocation sub-parameter, and wherein the first channel state information resource allocation sub-parameter corresponds to an amount of resources of the channel usable for conveying a first portion of channel state information and a second channel state information resource allocation sub-parameter corresponds to an amount of resources of the channel usable for conveying a second portion of the channel state information.

45. The storage medium of claim 38, wherein the processor-readable instructions configured to cause the processor to transmit the positioning state information comprise processor-readable instructions configured to cause the processor to concatenate the positioning state information to channel state information.

46. The storage medium of claim 45, wherein the processor-readable instructions configured to cause the processor to concatenate the positioning state information to the channel state information comprise processor-readable instructions configured to cause the processor to concatenate a first portion of the positioning state information to a first portion of the channel state information and to concatenate a second portion of the positioning state information to a second portion of the channel state information.

47. The storage medium of claim 38, wherein the processor-readable instructions configured to cause the processor to transmit the positioning state information comprise processor-readable instructions configured to cause the processor to transmit the positioning state information with a proximity, in the channel, to a reference signal based on at least one of control information associated with the positioning state information, or a quality of service associated with the positioning state information, or a positioning method associated with the positioning state information.

48. The storage medium of claim 38, wherein the processor-readable instructions configured to cause the processor to transmit the positioning state information comprise processor-readable instructions configured to cause the processor to transmit the positioning state information without mapping at least a portion of the positioning state information to any resource element designated for conveying a hybrid automatic repeat request.

49. The storage medium of claim 48, wherein the at least a portion of the positioning state information comprises a fixed-payload portion of the positioning state information, a positioning fix estimate, a reference transmission/reception point identification, or a positioning measurement.

\* \* \* \* \*